3,117,993
PURIFICATION OF DEHYDROABIETYL LOWER
ALKYLENE-DIAMINE DIHALIDE
Howard Bernard Wright, Gurnee, Ill., assignor to Abbott Laboratories, North Chicago, Ill., a corporation of Illinois
No Drawing. Filed July 26, 1961, Ser. No. 126,872
3 Claims. (Cl. 260—563)

This invention relates generally to the preparation of hydroabietyl lower alkylene diamine compounds and more particularly to an improved method of treating a mixture of hydroabietylamines to obtain therefrom relatively pure dehydroabietyl lower alkylene diamine compounds.

The hydroabietylamine, dehydroabietylamine, is a unique primary amine having a tricyclic ring structure which is obtained as part of a mixture of amines prepared by the hydrogenation of rosin acid nitriles and has the following formula:

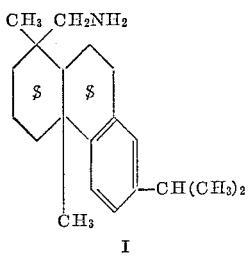

I

Dehydroabietylamine is available commercially under the trade name "Rosin Amine D" which consists of at least about 40% and preferably of about 60% dehydroabietylamine and with the balance of the mixture consisting primarily of dihydroabietylamine, tetrahydroabietylamines and closely related isomeric amines. Dihydroabietylamine and tetrahydroabietylamine differ from dehydroabietylamine only by four and six hydrogen atoms, respectively, and possess many of the physical properties of dehydroabietylamine.

It has previously been found that the dehydroabietyl lower alkylene diamines are particularly useful compounds in the synthesis of certain useful pharmaceutical compounds. Thus, for example, these dehydroabietyl lower alkylene diamines can be employed as intermediates for the preparation of N,N'-bis-(dehydroabietyl)-alkylenediamine dibenzylpenicillin salts by direct interaction of the amine, N,N'-bis-(dehydroabietyl)-ethylenediamine, with dibenzylpenicillin acid or a water soluble dibenzylpenicillin salt which form very sparingly water soluble salt products having marked therapeutic value.

Heretofore, the hydroabietyl lower alkylene diamines have been prepared by treating two moles of the hydroabietylamine with one mole of an alkylene dihalide, such as ethylene dibromide, by dissolving the hydroabietylamine in a suitable reaction solvent, such as benzene, and refluxing the mixture. The dihalide reaction product is formed only very slowly and requires refluxing for periods of about 16 hours. Moreover, the desired amine product is difficult to isolate in a relatively pure form from the reaction solvent.

It is therefore an object of the present invention to provide an improved and more economical method of obtaining hydroabietyl lower alkylene diamine compounds in a relatively pure form.

It is a further object of the present invention to provide an improved and more economical process of obtaining dehydroabietyl lower alkylene diamine compounds in relatively pure form.

It is still another object of the present invention to provide an improved and more economical method of obtaining dehydroabietylenediamine compounds in relatively pure form.

It is also an object of this invention to provide an improved method of treating a hydroabietylamine mixture containing substantial amounts of dehydroabietylamine, dihydroabietylamine, and tetrahydroabietylamine in order to obtain directly therefrom a hydroabietyl lower alkylene diamine compound in relative pure form.

Other objects of the invention will be apparent from the detailed description and claims to follow.

It has been found that a hydroabietyl lower alkylene diamine and particularly the dehydroabietyl lower alkylene diamines, such as dehydroabietyl-ethylenediamine, can be prepared in a much more economical manner than heretofore by directly reacting the dehydroabietylamine or a mixture containing dehydroabietylamine, dihydroabietylamine and tetrahydroabietylamine with a lower alkylene dihalide in the absence of a solvent by heating a mixture of the foregoing reaction to a temperature of about 70° C. whereupon the reaction proceeds exothermically and is completed in a matter of a few minutes in contrast with the many hours refluxing required heretofore. The dehydroabietyl lower alkylene diamine dihalide thus formed is readily recovered in crystalline form by slurrying the reaction mixture with an organic solvent, such as acetone, which serves as a dispersing agent to facilitate filtration or centrifuging.

More specifically, it has been discovered that by directly reacting one molar equivalent of a dehydroabietylamine or a mixture containing a substantial proportion of dehydroabietylamine, such as Rosin Amine D, with one equivalent of a lower alkylene dihalide, such as ethylene dibromide, ethylene bromide or ethylene dichloride, without a solvent for the reactants or reaction products, the desired reaction unexpectedly proceeds at a very rapid rate and is completed in a much shorter period of time than when a solvent is present in which the reactants or reaction products are soluble. The hydroabietyl lower alkylene diamine dihalide formed is readily recovered as a crystalline solid simply by dispersing the reaction mixture with preferably between about two and four parts by weight of a polar solvent of the amphiprotic type such as diloweralkyl ketones, lower alkanols and loweralkyl esters of acetic acid of which acetone, ethyl alcohol, butyl acetate, and methyl isobutyl ketone are examples and which have a limited solubility for the hydroabietyl lower alkylene dihalide product and thereafter recovering the product by filtering or centrifuging in the usual manner.

In the following specific examples are shown several specific embodiments of the present invention but it should be understood that the invention is not to be limited to the specific reactions disclosed nor to the precise proportions or conditions set forth in the several specific examples, since the examples are given only for the purpose of illustrating the principle of the present invention.

*Example I*

Rosin Amine D, 28.5 grams, is covered with ethylene dibromide, 18.7 grams, and heated on a steam bath. In 20 minutes the internal temperature rises to 115° C. and the solution thickens. The reaction mixture is then dissolved in four volumes of acetone and the crystalline dehydroabietylethylenediamine hydrobromide product readily separates. Upon filtration and drying, the white crystalline product consisting of relatively pure dehydroabietylethylenediamine dihydrobromide exhibits an equivalent weight of 391 (Theory 379). The said diamine product when dissolved in ethyl alcohol and examined under ultraviolet light exhibits ultraviolet absorption maxima at 268±1 and 276±1 millimicrons and a minimum at 273±1 millimicrons which are characteristics of the said dehydroabietyl product and distinguishes from products containing primarily the dihydroabietyl or the tetrahydroabietyl amine groups.

*Example II*

Rosin Amine D, 230 pounds, and ethylene dibromide, 150 pounds, are mixed by stirring in a stainless steel still. Heat is then applied until the temperature rises to 70° C. Heating is discontinued and 200 gallons of acetone is pumped in as rapidly as possible. The solution is then heated to reflux and stirred to break up clumps of crystals of dehydroabietylethylenediamine and to solubilize the other hydroabietyl diamines present. The reaction mixture is then cooled to 20° C. and centrifuged. The product is washed with 100 gallons of acetone and dried. The hydroabietylethylenediamine dihydrobromide product has an equivalent weight of 394 (Theory 379). The said diamine product when dissolved in ethyl alcohol and examined under ultraviolet light exhibits ultraviolet absorption maxima at 268±1 and 276±1 millimicrons and a minimum at 273±1 millimicrons which are characteristics of the said dehydroabietyl product and distinguishes from products containing primarily the dihydroabietyl or the tetrahydroabietyl amine groups.

*Example III*

Rosin Amine D, 227 grams, containing 45% dehydroabietylamine is covered with ethylene dichloride, 80 grams, and stirred and refluxed. The internal temperature rises to 115° C. and in approximately 70 minutes the solution becomes mushy. One liter of acetone is added to the reaction mixture. Upon filtration and drying, the white crystalline relatively pure dehydroabietylethylenediamine dihydrochloride product has an equivalent weight of 355 (Theory 335) and contains 80% dehydroabietylethylenediamine dihydrochloride. The said diamine product when dissolved in ethyl alcohol and examined under ultraviolet light exhibits ultraviolet absorption maxima at 268±1 and 276±1 millimicrons and a minimum at 273±1 millimicrons which is characteristic of the said dehydroabietyl product. When the above diamine dihydrochloride product is treated with sodium hydroxide, a heavy oil is formed which on analysis is identified as being substantially the dehydroabietylethylenediamine base.

*Example IV*

Rosin Amine D, 227 pounds, and ethylene dichloride, 80 pounds, are placed into a stainless steel still, stirred for 0.5 hours and heated for 1.25 hours. The temperature rises to 115° C. and the solution becomes mushy. To the reaction mixture is rapidly added 100 gallons of acetone and the crystalline precipitate is cooled to 20° C. The relatively pure dehydroabietylethylenediamine dihydrochloride product is then washed with the balance of the acetone and dried in an air dryer at 45° C. The monohydrated dihydrochloride salt of N,N'-bis-(dehydroabietyl)-ethylenediamine upon recrystallization from ethyl alcohol has a melting point with decomposition at 292–295° C. An ethyl alcohol solution of the said product exhibits ultraviolet absorption maxima at 268±1 and 276±1 millimicrons and a minimum at 273±1 millimicrons.

*Example V*

Following the procedure of Example IV, ethylene dichloride is replaced by ethylene bromochloride to perpare the mixed dihalide product.

*Example VI*

Following the procedure of Example IV, ethylene bromiodide is used as the dihalide in place of the ethylene dichloride to produce the relatively pure dihydroabietylethyl dihalide product.

*Example VIII*

Following the procedure of Example IV, trimethylene bromide is used in place of the ethylene dichloride to produce the dihalide product.

*Example VIII*

The dihydrochloride salt of the dehydroabietylethylenediamine base, 115 grams, as prepared in Example IV is extracted with a solvent mixture of about 4 liters of chloroform and 4 liters of water which is adjusted to about pH 10 and a second extraction is performed using a solution of about 2 liters of chloroform and the mixture readjusted to about pH 10 with 6N NaOH if necessary. The chloroform layer containing the mixed free bases is separated from the aqueous layer containing NaCl and is washed with about 1/10 its volume of water to remove any NaCl in the wet chloroform solution. The chloroform solution containing a mixture of the free bases having a volume of about 6 liters is dried with anhydrous $Na_2SO_4$ and then filtered to obtain a clear solution containing about 1 kilogram of the mixed free bases.

Approximately 230 grams of crude procaine penicillin G are extracted with a solution containing about 4 liters of ethyl acetate and 4 liters of water which has been adjusted to between pH 2 and 3 with 6N sulfuric acid at a temperature of about 5° C. The procaine penicillin G is thereafter again extracted with about 2 liters of ethyl acetate and the mixture is again adjusted to a pH of 2 to 3 with 6N sulfuric acid if necessary. The ethyl acetate solution containing penicillin G acid is then washed with about 1/10 its volume of water to remove any trace of sulfuric acid and water soluble procaine sulfate contained in the ethyl acetate solution. The acetate solution having a volume of about 6 liters is dried with anhydrous $Na_2SO_4$ and then filtered to obtain a clear solution of approximately 300,000 units of penicillin per ml. The aqueous phase containing procaine sulfate can be treated to recover procaine therefrom.

The chloroform solution of the free bases prepared in the above manner is then slowly added to the ethyl acetate solution of the penicillin G acid prepared in the above manner. A clear solution forms which rapidly becomes turbid as the bases react with the penicillin acid and crystallization commences. The reaction mixture is allowed to stand overnight in a cool room having a temperature of about 5° C. after thoroughly agitating the mixture. Thereafter the crystalline N,N'-bis-(dehydroabietyl)-ethylenediamine dibenzylpenicillin is filtered to separate therefrom the cooled mother liquor which contains quantities of the unprecipitated N,N'-bis-(dihydroabietyl)-ethylenediamine-dibenzylpenicillin salt and N,N'-bis-(tetrahydroabietyl)-ethylenediamine-dibenzylpenicillin salt and other impurities. The precipitate is washed thoroughly with about 4 liters of a mixture of chloroform and ethyl acetate (1:1) which is divided into three separate portions. After the final washing the crystals are substantially colorless. The crystalline penicillin salt is thoroughly dried under vacuum at a temperature of about 35° C. The N,N'-bis-(dehydroabietyl)-ethylenediamine-dibenzylpenicillin salt is obtained having purity as determined by solubility analysis in excess of 91% and melts with decomposition at 167–169° C. on a Kofler hot stage.

The equivalent weights of the above disclosed dihydrohalide compounds of the present invention are determined by dissolving approximately 300 mg. of the hydrochloride in 50 cc. of glacial acetic acid and adding thereto 10 cc. of a 6% solution of mercuric acetate in glacial acetic acid. Thereafter the solution is titrated potentiometrically with 0.1 N perchloric acid in glacial acetic acid using silver-glass electrodes and the equivalent weight calculated by dividing the weight of the sample in mg. by the product of the cubic centimeters of 0.1 N perchloric acid used and the normality.

The lower alkylene dihalides which can be employed in the present invention are those having between two and eight carbon atoms per molecule, including such lower alkylene dihalides as ethylene dichloride, ethylene dibromide, ethylene diiodide, isopropylene dichloride, isopropylene diiodide, ethylene chlorobromide, isopropylene chloroiodide, ethylene bromiodide, isopropylene dibromide.

The polar solvents of the amphiprotic type are the most useful and suitable for recovering the dehydroabietylethylenediamine salts from the said dehydroabietyl alkylene diamine dihalides because they are inert toward the said dihalide products and have only limited solubility for the said dihalide product. In addition, the amphiprotic polar solvents cause the said dehydroabietyl alkylene diamine compound to crystallize in a form which greatly facilitates its recovery from the reaction mixture by filtration or centrifuging. These amphiprotic polar solvents are illustrated by the solvent acetone and include the solvents methyl isobutyl ketone, methyl acetate, butyl acetate, butyl alcohol, ethyl alcohol and isopropyl alcohol.

This application is a continuation-in-part of applicant's co-pending Serial No. 724,923, filed March 3, 1958, now abandoned, which is a divisional application of applicant's abandoned application Serial No. 502,528, filed April 19, 1955.

Others may readily adapt the invention for use under various conditions of service, by employing one or more of the novel features disclosed or equivalents thereof. As at present advised with respect to the apparent scope of my invention, I desire to claim the following subject matter.

I claim:

1. The method of preparing a relatively pure dehydroabietyl lower alkylenediamine dihalide from a mixture of hydroabietylamine lower alkenylenediamine dihalides containing a substantial proportion of dehydroabietylamine lower alkylene diamine dihalide and a small proportion of dihydroabietylamine and tetrahydroabietyl lower alkylenediamine dihalides, said dihalides being selected from the group consisting of chlorides, bromides, iodides and combinations thereof, which comprises intimately mixing the said mixture with an amphiprotic polar solvent selected from the class consisting of diloweralkyl ketones, loweralkyl esters of acetic acid and lower alkanols to form a homogeneous solution, and allowing the solution to stand until crystallization of the dehydroabietylamine dihalide therefrom is substantially complete.

2. A method substantially as in claim 1 wherein the said solvent is methyl isobutyl ketone.

3. A method substantially as in claim 1 wherein the said solvent is acetone.

No references cited.